Oct. 20, 1970  H. J. GERMIAT ET AL  3,534,644
CUTTING APPARATUS
Filed Aug. 12, 1968  3 Sheets-Sheet 1
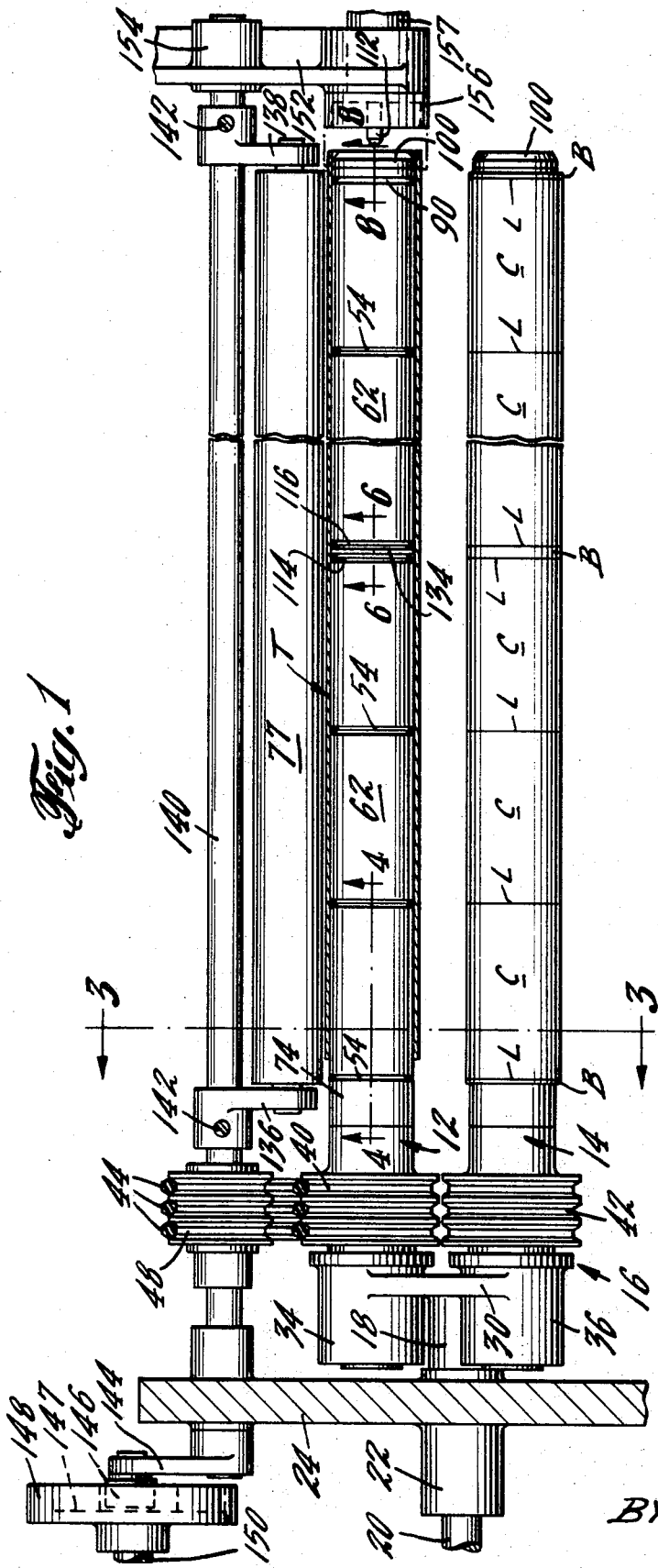
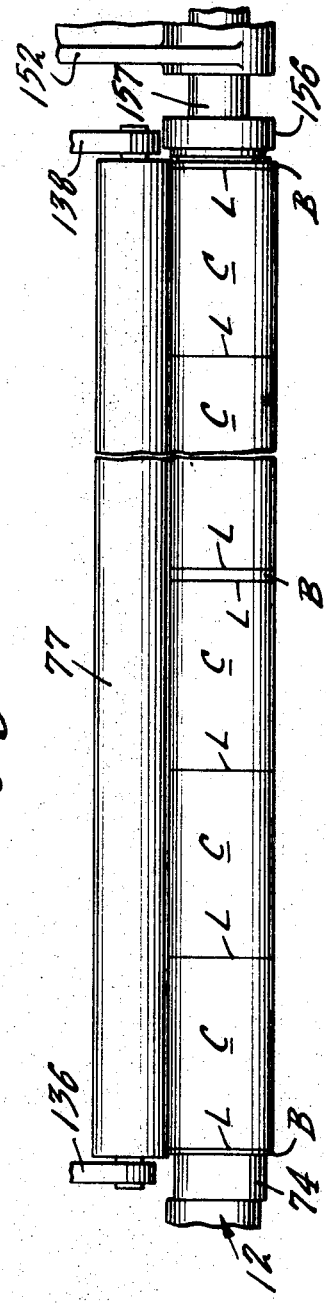
INVENTORS
HUBERT JOSEPH GERMIAT
JOHN RALPH PESCHKE
ROBERT MILLER WEYGANT
BY Frank J. Jordan
ATTORNEY

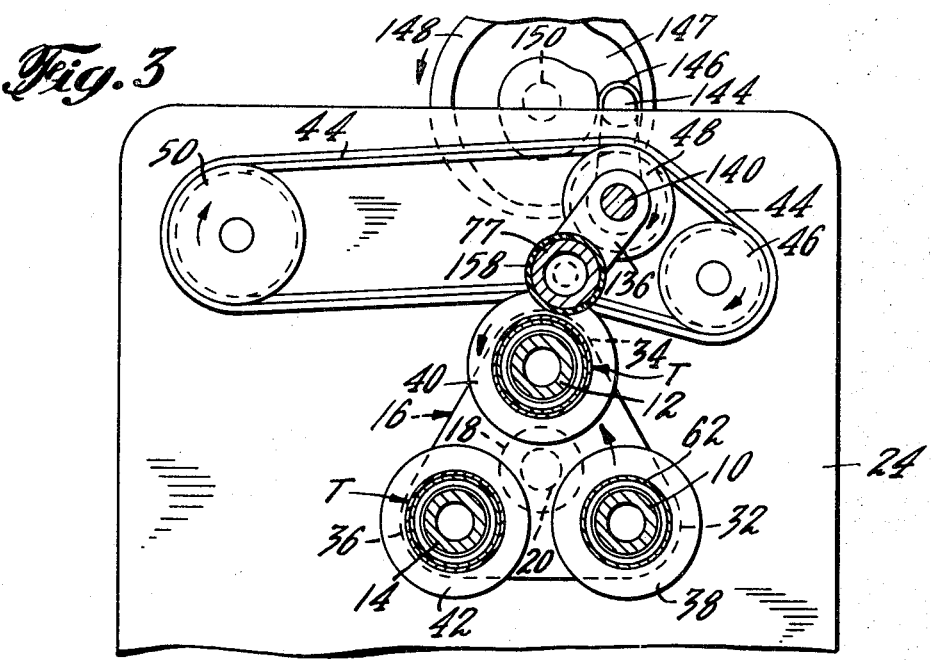
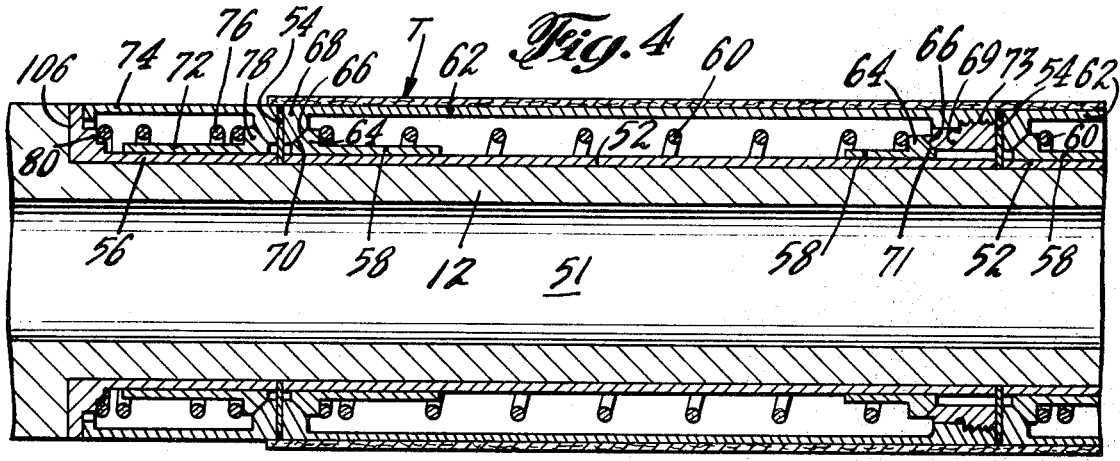
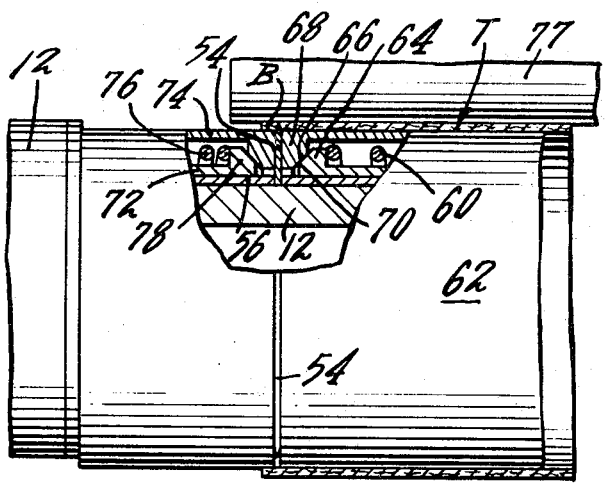

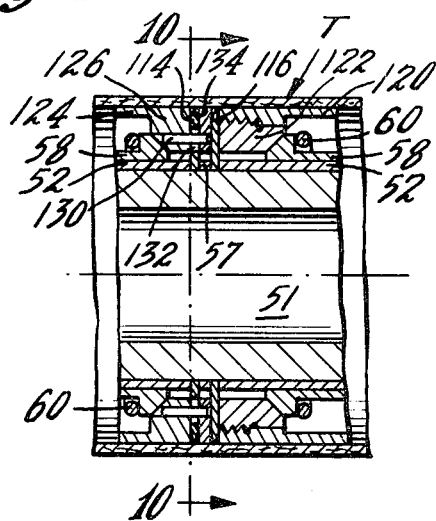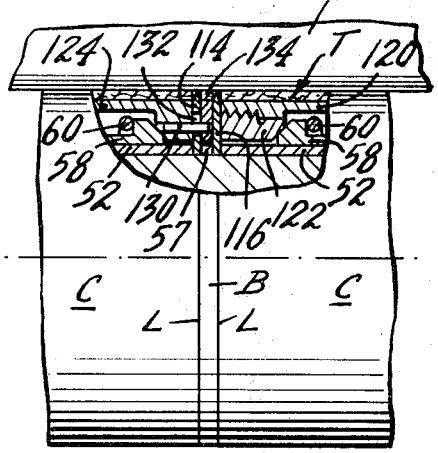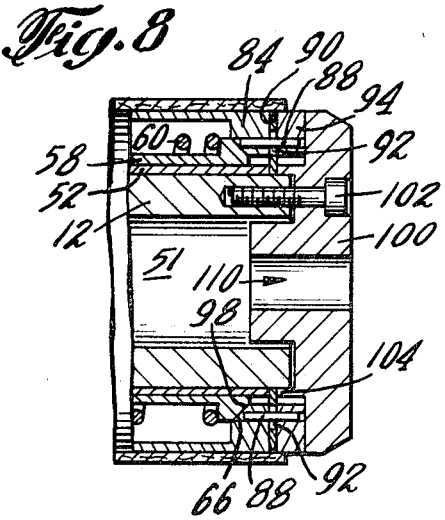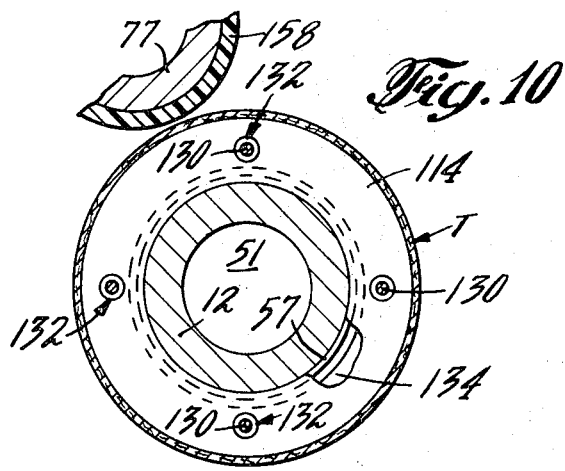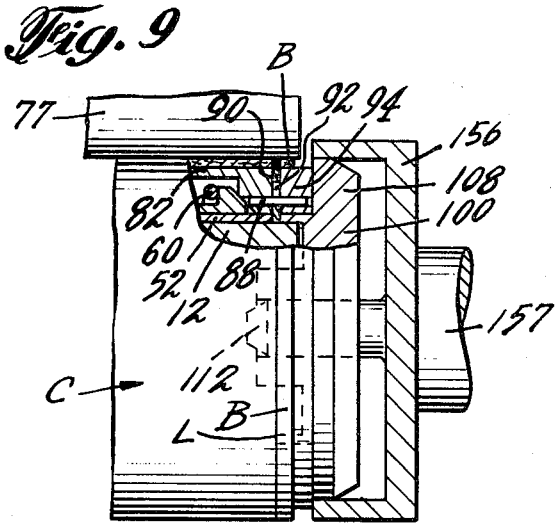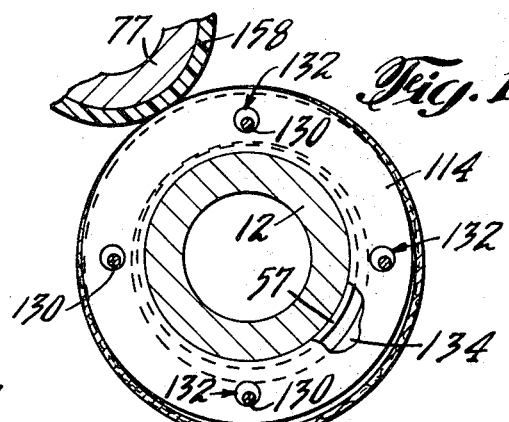

United States Patent Office 3,534,644
Patented Oct. 20, 1970

3,534,644
CUTTING APPARATUS
Hubert Joseph Germiat, Fox River, John Ralph Peschke, Prospect Heights, and Robert Miller Weygant, Waukegan, Ill., assignors to American Can Company, New York, N.Y., a corporation of New Jersey
Filed Aug. 12, 1968, Ser. No. 751,964
Int. Cl. B23b 3/04
U.S. Cl. 82—82                                    12 Claims

ABSTRACT OF THE DISCLOSURE

In an apparatus for cutting tube sections into container body lengths and for cutting out or off relatively narrow trim bands, a mandrel shaft, on which a tube section or stick to be cut is received, fixedly mounts a cutting knife. A sleeve is disposed on one longitudinal side of the cutting knife and a support ring on the other side. The sleeve is mounted for movement between concentric and eccentric positions relative to said mandrel shaft, and means interconnect said sleeve and support ring to provide simultaneous and concurrent movement of said sleeve and support ring between said concentric and eccentric positions as the tube section is cut from the inside out by said cutting knife.

BACKGROUND OF THE INVENTION

In the art of manufacturing containers, it is well-known to form elongated prelabeled tubes from which the individual container bodies are derived. These elongated tubes may be formed in a well-known manner by helically winding onto a suitable mandrel a plurality of ribbons of sheet material made of paper, plastic, foil or the like, with the successive layers of helically wound ribbons of sheet material having either butt joints or overlapping joints between their convolutions. The layers are superimposed upon each other with suitable adhesives therebetween and with the joints between the successive convolutions of one layer out of alignment with those of the next layer so that in this way it is possible to build up a rigid tubular structure. The tubes are formed in this way in practically endless lengths inasmuch as the ribbons of sheet material which are helically wound are derived from large supply rolls from which the ribbons are continuously fed onto the winding mandrel in a manner well known in the art. The ribbon of sheet material forming the outer layer of the elongated tube has repetitive, unitary label patterns printed thereon such that each container cut from the elongated tube will already be labeled. It is well known that such unitary patterns frequently get out of register because of inherent winding and cutting errors.

For convenience in handling, it is customary in the art to cut the elongated tube as it comes off of the spiral winding machine into multibody segments or sticks by a reciprocal cutter knife which is indexed with the movement of the elongated tube as the latter is being formed. The sticks are subsequently cut into individual container bodies on a machine known as a recutter. The reciprocal mechanism for cutting the sticks from the elongated tube cannot always be made to cut accurately or clean enough to satisfactorily subdivide two adjacent container bodies with a single cut. Accordingly, a blank space or trim blank incorporating a circumferential ring is included in the tube so that the reciprocal cutter will cut off each stick at said trim band. This, of course, leaves portions of the trim band at the ends of each of the sticks which are removed as trim when the sticks are subsequently cut into individual container body lengths.

The printing cylinder which prints the label on the ribbon of sheet material which ultimately forms the outer layer of the tube has provision for including this trim band as a narrow blank area. Considering the practicalities and economics as they relate to the diameter of the printing cylinder and to the length of the sticks, it is frequently desirable that the printing cylinder make two or more revolutions in printing all the labels for a single stick. Since, in accordance with the above, it is necessary to include on the printing cylinder provision for a trim band, it will be apparent that in making two or more revolutions, the printing cylinder will print the trim band at one or more intermediate sections of the stick. Thus, each stick will have a length at least equal to a multiple of the ultimate tubular container body plus a relatively small excess or trim band at both longitudinal ends and one or more additional relatively small excess lengths or trim bands at one or more intermediate longitudinal positions of the stick. These excess lengths or trim bands are removed as trim when the stick is cut into individual container bodies.

In copending application Ser. No. 752,032 filed Aug. 12, 1968, there is disclosed apparatus for cutting a stick into container body lengths by utilizing circular cutting knives fitted onto a main shaft of a recutter mandrel. A sleeve on which a stick is received is mounted on the mandrel shaft adjacent one of said cutting knives for movement between concentric and eccentric positions relative to the mandrel shaft. When a backup roller is brought into contact with the stick to shift the latter and the aforementioned sleeve into an eccentric position, the cutting knives will be exposed to cut the stick from the inside out. The sleeve has a longitudinal length substantially equal to the length of the desired container body and accordingly, there is ample room within the sleeve to house the sleeve mounting mechanism. However, there is a relatively small space available to house the mechanism which supports the narrow trim bands as the latter are cut out or off of the stick. The present invention is concerned with supporting the narrow trim bands as the latter are cut out or off of a stick on a recutter mandrel and are stripped off of said mandrel.

SUMMARY OF INVENTION

In an apparatus for cutting a tube section into container body lengths and for cutting out or off relatively narrow trim bands, a rotatable mandrel shaft fixedly carries a circular cutting knife. A sleeve located on one longitudinal side of said cutting knife and having an outside diameter at least as large as the diameter of the cutting knife is mounted on the mandrel shaft for movement between concentric and eccentric positions relative to the mandrel shaft. A support ring is mounted on the opposite longitudinal side of said cutting knife. A tube section to be cut is received over said sleeve, cutting knife and support ring. Interconnecting means connect said sleeve and support ring to provide simultaneous and concurrent movement of said sleeve and support ring between said concentric and eccentric positions whereby the sleeve supports a container body and the support ring supports a narrow trim band as the tube section is cut by said cutting knife from the inside out upon displacement of said tube section, sleeve and support ring from a concentric to an eccentric position.

BRIEF DESCRIPTION OF THE DRAWINGS

FIG. 1 is an elevational view, parts of which are broken away and shown in section, of an apparatus for cutting tubes according to one embodiment of the invention.

FIG. 2 is an elevational view of a portion of the apparatus shown in FIG. 1 with the parts shown in a different operating position.

FIG. 3 is a transverse section taken substantially along line 3—3 of FIG. 1 looking in the direction of the arrows.

FIG. 4 is a longitudinal section taken substantially along line 4—4 of FIG. 1.

FIG. 5 is a fragmentary, longitudinal section showing a portion of the parts shown in FIG. 4 but in a different operating position.

FIG. 6 is a longitudinal section taken substantially along line 6—6 of FIG. 1.

FIG. 7 is a fragmentary, longitudinal section showing a portion of the parts shown in FIG. 6 but in a different operating position.

FIG. 8 is a longitudinal section taken substantially along line 8—8 of FIG. 1.

FIG. 9 is a fragmentary, longitudinal section showing a portion of the parts shown in FIG. 8 but in a different operating position.

FIG. 10 is a transverse section taken substantially along line 10—10 of FIG. 6.

FIG. 11 is a sectional view similar to FIG. 10 but showing the parts in a different operating position.

DESCRIPTION OF THE PREFERRED EMBODIMENTS

As has been indicated heretofore, the structure which will eventually form the tube from which the container bodies are to be cut is initially in the form of layers of windings of suitable material superimposed on and adhering one to the other. This tube is made on a suitable winding mandrel (not shown) by known means. For convenience in handling, the tube which is cotinuously formed in this manner is cut into tube sections or sticks T each of which is to be subdivided into a plurality of individual can bodies by the apparatus described herein. Each of the tube sectinos T comprises a predetermined number of labeled container bodies C and a plurality of trim bands B separated by lines of potential severance L.

As can best be seen in FIG. 3, three mandrels 10, 12, 14, are mounted 120° apart on a rotatable turret 16. The turret 16 is provided with a hub 18 about which the mandrels 10, 12, 14 are adapted to be indexed or rotated to pass through three operating stations. In FIG. 3, the mandrel 10 is in the loading station, mandrel 12 is in the cutting station, and mandrel 14 is in the discharge station.

The hub 18 is keyed to a central shaft 20 which in turn is rotatably mounted within a bearing support 22 (FIG. 1) rigidly mounted on a supporting frame 24. The shaft 20 is intermittently rotated as by a Maltese-cross or Geneva drive (not shown) for example, so as to periodically turn the shaft 20 and turret 16 through angles of 120°. The rotary movement of the turret member 16 is synchronized with the reciprocation of a pusher plate (not shown) in a suitable manner so that as the mandrels 10, 12, 14 are successively moved into the loading station into predetermined alignment with a feed trough (not shown), the pusher plate situated at the loading station will advance a tube section T longitudinally onto the particular mandrel 10, 12, 14 which is situated in the loading station.

The turret 16 comprises the hub 18, previously described, a web 30 fixed to the hub 18, and three bearing assemblies 32, 34 and 36 supported by and fixed to the web 30. Each bearing assembly 32, 34, 36 has a central bore in which end portions of the mandrels 10, 12 and 14 respectively, are rotatably supported. Each mandrel 10, 12, 14 fixedly mounts a pulley 38, 40 and 42 respectively, each of which is adapted to be engaged and rotated by belts 44 when the particular mandrel is in the cutting station. The belts 44 are continuously driven and are guided about pulleys 46, 48 and 50, one of which may be driven in any suitable manner. As each mandrel 10, 12 or 14 comes into the cutting station, the pulley 38, 40 or 42 which is mounted therewith comes into engagement with the constantly driven belts 44 so that whenever a mandrel is at the cutting station, it will be rotated together with the tube secion T which is carries. As best shown in FIG. 3, each pulley 38, 40, 42, as it is indexed into the cutting station, passes beyond the line of tangency extending between pulleys 46 and 50 so that the belts 44, in passing from pulley 46 to pulley 50, will engage and rotate the particular pulley 38, 40 or 42 which is situated in the cutting station.

As can best be seen in FIG. 4, the mandrel 12 which may have a bore 51 therein as shown, mounts a plurality of cylindrical spacers 52. These spacers 52 serve to rigidly mount and support a plurality of circular cutting knives 54 each of which has a central opening adapting each knife to be received on the mandrel 12 as shown in FIG. 4. As can best be seen in FIG. 4, the longitudinal ends of the cylindrical spacers 52 abut and support the circular cutting knives 54 so that the mandrel 12, the spacers 52, and the cutting knives 54, define a unified, rotatable structure concentric to the centerline of the mandrel 12. The longitudinal lengths of the spacers 52 are substantially equal to the longitudinal length of a container body C whereby the spacers 52 locate the cutting knives 54 in the desired position to cut the tubular section T into container body lengths C. A spacer ring 57 (FIG. 6) is carried on the mandrel 12 between two relatively closely spaced cutting knives which are adapted to cut out a trim band as will further be described. An end spacer 56 (FIG. 4) is fitted at the turret end of the mandrel 12 to establish the position of and support the end cutting knife 54 which will trim one longitudinal end of the tubular section T.

Mounted for longitudinal sliding movement on either side of the right hand cutting knife 54 in FIG. 4 are two cylindrical slides 58. These slides 58 fit loosely on the spacers 52 and are freely slidable thereon in an axial direction. The slides 58 are urged toward an adjacent cutting knife 54 by spring means in the form of coil springs 60 which encircle the mandrel shaft 12.

Disposed radially outwardly of the slides 58 are a plurality of cylindrical sleeves 62 which define the outer surface of the mandrel 12. A mandrel sleeve 62 is located between the two circular knives 54 shown in FIG. 4 and is substantially equal in length to the longitudinal length of the container body C to be cut from the tube section T.

Each slide 58 has an outer flange 64 at one longitudinal end and each such flange 64 has a frusto-conical surface 66 generally facing the adjacent cutting knife 54. Each mandrel sleeve 62 has two inner flanges 68 and 69 each provided with a frusto-conical surface 70 and 71 respectively, which are adapted to mate and provide sliding contact with the frusto-conical surface 66 on an associated mandrel slide 58. One of the two inner flanges on the mandrel sleeve 12 (in the illustrated embodiment, inner flange 69) is detachably affixed as by the threads 73, to the mandrel sleeve 62 to facilitate assembly in that initial detachment of the inner flange 69 readily permits placement of the slides 58 and spring 60 into the assembled position shown in FIG. 4.

As in the case of the end spacer 56, an end slide 72 and an end sleeve 74 are provided on the turret end of mandrel 12 and a spring means in the form of a coil spring 76 disposed around the end slide 72 has one end abutting an outer flange 78 on the end slide 72 and the other end abutting a shoulder 80 on the end spacer 56.

From the above description it will be apparent that the plurality of coil springs 60 and the end spring 76, all initially installed under compression, tend to urge the plurality of slide members 58 and the end slide 72 towards the cutting knives 54 with which they are associated. With each of the plurality of slide members 58 and the end slide 72 biased in the aforesaid position closest to the associated cutting knife 54, the mandrel sleeves 62 and end sleeve 74 assume a position concentric with the centerline of the mandrel 12 as shown in FIG. 4. This is so because the frusto-conical surfaces 66 on the plurality of slides 58 engage the frusto-conical surfaces 70 and 71 on the plurality of sleeves 62 to urge and move the latter in a longitudinal direction until centered relative to the longitudinal axis of the mandrel 12. Similarly, the frusto-conical surface on the end slide 72 engages the frusto-conical surface on the end sleeve 74 to center the end sleeve 74.

It will be seen that both cutting knives 54 shown in FIG. 4 have associated therewith a pair of slides 58, 58 and 72, 58 and a plurality of intermediate sleeves 62 and an end sleeve 74 whereby all the sleeves are normally urged and held in a position concentric to the centerline of the mandrel shaft 12. The outer diameter of the circular knives 54 is just equal to or slightly less than the outer diameter of the mandrel sleeves 62 and 74. Accordingly, when the mandrel sleeves 62, 74 are in a concentric position (FIG. 4) the outer peripheral edge of the cutting knives 54 will be disposed between two adjacent sleeves and will not protrude beyond the circumference of the sleeves 62, 74 or otherwise interfere as a tubular section T is slid longitudinally onto or off of the mandrel 12. However, as will be described in greater detail hereinafter, once a tubular section T is slid into position on the mandrel and the latter is indexed to the cutting station 12, a backup roll 77 having a length substantially equal to or just slightly greater than the length of the tube section T and mounted with its longitudinal axis parallel to that of the mandrel, is moved laterally of its longitudinal axis to engage the tube section T to urge the latter in a lateral direction. As this occurs, mandrel sleeves 62, 74 are shifted laterally into an eccentric position (FIG. 5) thereby exposing the cutting knives 54 which remain in their fixed concentric position so that the knives 54 cut the tubular section T along the lines of severance L as the mandrel is rotated.

Turning now to a description of the parts used for trimming the other end of the tube section T, it will be seen in FIG. 8 that the free end of the mandrel 12 carries a sleeve 82 which is provided with an inner flange 84 having a plurality of longitudinal openings in each of which the end section of a pin 88 is received with a tight or snug fit. The end of the mandrel 12 also carries a circular cutting knife 90 which is provided with a plurality of openings 92 generally aligned with the pins 88 but of a larger diameter. An annular end support ring 94, located on the mandrel adjacent the cutting knife 90, is likewise provided with a plurality of longitudinal openings generally aligned with the pins 88 and receiving pins 88 with a tight or snug fit. Thus, it will be readily apparent that the end support ring 94 located on one side of the circular cutting knife 90 and the end sleeve 82 located on the other side of the cutting knife 90 are interconnected by the pins 88 which pass through the enlarged openings 92 in the cutting knife 90. It will be apparent, therefore, that the end ring 94 will move with the end sleeve 82 as a unit. Thus, with the end sleeve 82 disposed in a concentric position relative to the centerline of mandrel 12 by virtue of the bias of spring 60 urging the frusto-conical surface 66 of slide member 58 into contact with the frusto-conical surface 98 of end slide 82, the end ring 94 will likewise be disposed in a concentric position. When the tube section T and end sleeve 82 are moved into an eccentric position (FIG. 9) by the backup roll 77 to effect the cutting operation, as previously mentioned, the end ring 94 will likewise be moved into the same eccentric position so that the trimmed off end band B (FIG. 9) of the tube is continuously supported by the end ring 94 during the cutting operation. When the backup roll 77 is returned to its inoperative position (FIG. 1), the end sleeve 82 and the end ring 94 to which the end sleeve 82 is connected, are recentered or returned to their concentric position by virtue of the bias of spring 60 as previously described.

As previously mentioned, the openings 92 in the circular knife 90 have a diameter larger than that of the pins 88 thereby permitting lateral translatory movement of the pins 88 in the knife openings 92. Also, the diameter of the central opening in the end ring 94 is larger than the outer diameter of the mandrel 12 to permit lateral translatory movement of the end ring 94 relative to the mandrel 12.

It will be seen in FIG. 8 that an end cap 100 is affixed to the end of the mandrel 12 by a plurality of threaded fasteners 102. The end cap 100 has a collar 104 which fits over the end of the mandrel 12 to abut the circular knife 90. The end cap 100 serves to apply a longitudinal force on all the spacers 52, 56, 57 and knives 54, 90, 114, 116 (the latter two to be described), to secure the latter between said end cap 100 and a shoulder 106 (FIG. 4) on the turret end of the mandrel 12. The end cap 100 is also provided with a flange portion 108 disposed on one side of the end ring 94. The flange portion 108 is spaced from the knife 90 as to provide a loose fit for the end ring 94 therebetween, so that the latter is free for translatory movement as previously mentioned. A central bore 110 in the end cap 100 is adapted to receive a support pin 112 (FIG. 1), to be further described, to rotatably support the end of the mandrel 12 when the latter is rotated in the cutting station.

Turning now to the parts used for trimming the intermediate trim ban B, it will be seen in FIG. 6 that an intermediate section of the mandrel 12 mounts two spacers 52 between which are supported two circular cutting knives 114, 116 which are in turn separated or spaced from one another by means of the previously described spacer ring 57. It will be apparent that the spacers 52 and spacer 57 lock the cutting knives 114, 116 in the concentric and longitudinally spaced position shown in FIG. 6. Located on the side of each cutting knife 114, 116 are spring biased slides 58 of the type previously described. Located adjacent the knife 116 is a mandrel sleeve 120 having a detachably affixed inner flange 122 which mates with the associated slide 58 along frusto-conical surfaces as previously described. Located adjacent the knife 114 is a mandrel sleeve 124 having an inner flange 126 which mates with the associated slide 58 along frusto-conical surfaces and which is provided with a plurality of longitudinal openings in each of which the end sections of a pin 130 is affixed as by a tight or snug fit. The cutting knife 114 is provided with a plurality of openings 132 generally aligned with the pins 130 but of a larger diameter than the pins 130. An annular support ring 134 located on the mandrel 12 between the knives 114, 116 is likewise provided with a plurality of longitudinal openings generally aligned with the pins 130 and receiving said pins with a tight or snug fit. It will be apparent, that the support ring 134 located between the cutting knives 114, 116 and the mandrel sleeve 124 are interconnected by the pins 130 which pass through the enlarged openings 132 in the cutting knife 114. Accordingly, the support ring 134 will move with the mandrel sleeve 124 as a unit. Thus, with the mandrel sleeve 124 disposed in a concentric position relative to the centerline of mandrel 12 by virtue of the associated springbiased slide 58, the support ring 134 will likewise be disposed in a concentric position. When the tube section T and mandrel sleeve 124 are moved into an eccentric position (FIG. 7) by the backup roll 77 to effect the cutting operation, as will be described, the support ring 134 will likewise be moved into the same eccentric position so that the intermediate trim band B will be continuously supported by the support ring 134 during the cutting operation. When the backup roll 77 is returned to its inoperative position (FIG. 1), the sleeve 124 and the support ring 134 to which the sleeve 124 is connected are recentered or returned to their concentric position by virtue of the bias of spring 60 as previously described. As previously mentioned, the openings 132 in the circular knife 114 have a diameter larger than the pins 130 thereby permitting lateral translatory movement of the pins 130 in the knife openings 132. Also the diameter of the central opening in the support ring 134 is larger than the outer diameter of mandrel 12 to permit lateral translatory movement of the support ring 134 relative to the mandrel 12.

The previously mentioned backup roll 77 is supported by and mounted for rotation in bearings carried in support brackets 136 and 138. The support brackets 136, 138 are adapted to be pivoted by a means of shaft 140 to which the brackets 136, 138 are secured, as by set screws 142. The shaft 140 is mounted for rotation within a bearing in the previously described frame member 24 and in a bearing 154 mounted in a frame member 152 at the opposite end thereof. As the shaft 140 is rotated, by means to be described, the backup roll 77 will be pivoted between operable and inoperable positions. In the inoperable positions, as shown in FIGS. 1 and 10 for example, the backup roll 77 is spaced from the tube section T on the mandrel in the cutting station so that successive mandrels may be indexed into and out of the cutting station without without interference from the backup roll 77. In pivoting from the inoperable to the operable position, the latter position being shown in FIGS. 2 and 11 for example, the backup roll 77 engages the tube section T, exerts a lateral force thereagainst and forces the mandrel sleeves into the previously mentioned eccentric disposition, thereby exposing the cutting knives and effecting the cutting of the tube section from the inside out as the mandrel 12 is rotated as previously described.

The shaft 140 may be provided with a bearing to rotatably support the pulley 48 about which the previously described belts 44 pass. The pulley 48 is freely rotatable on the shaft 140.

One end of the shaft 140 fixedly carries a lever 144 which supports for relative rotation at its free end, a cam follower roller 146. The cam follower roller 146 is received in and engages the side walls of an endless groove 147 in a cam plate 148, as best shown in FIGS. 1 and 3. The cam plate 148 is fixed on a shaft 150 which is rotated by any suitable drive means (not shown) at such a speed that the cam plate 148 will turn through one revolution for each operating cycle.

In making one revolution, the cam plate 148 is operable to pivot the backup roll 77 between the inoperative and operative positions previously described. More specifically, the cam groove 147 varies in its distance from the centerline of the cam plate 148 so that as the cam plate 148 rotates, the follower roller 146 follows the contour of the groove 147 to thereby pivot the lever 144 about the centerline of shaft 140. Since the lever 144 is fixed to shaft 140, the latter also pivots to thereby pivot the levers 136, 138 on which the backup roll 77 is carried. It will be apparent, therefore, that the contour of the groove 147 in cam plate 148 determines the character of the pivotal movement of the backup roll 77. Thus, the cam groove 147 may be designed to move the backup roll 77 into contact or near contact with the tube section T at a relatively quick rate and then to continue to move the backup roll 77 at a slower rate so that the backup roll 77 is fed gradually against the tube section T. The arrangement may be such that the eccentric position of the mandrel sleeves necessary to effect a complete cut through the tube sections T may not be reached until the mandrel has made several revolutions. Expressed otherwise, the tube section T may make several revolutions from the time of initial contact of the cutters with the tube section until the latter is completely cut all the way through. Of course, when mandrel 12 reaches the cutting station, its pulley 40 will have come into engagement with the drive belts 44 so that the mandrel 12 with the tube section thereon continuously rotates while in the cutting station.

The cam 148 after pivoting the backup roll 77 to effect the cutting operation as aforesaid and, as desired, permitting a dwell of the backup roll 77 in its maximum or near maximum operative pivotal position during several revolutions of the tube section, is then operable to return the backup roll 77 to its inoperative position whereby the mandrel sleeves are recentered and the backup roll 77 is free and clear of the centered and cut tube section. This, of course, permits the machine to be indexed whereby the turret 18 is rotated 120° and the mandrel having the cut tube section T thereon is placed in the discharge station where the container bodies C and the trim bands B may be stripped longitudinally off of the mandrel by known means (not shown). Of course, when the machine is indexed as aforesaid, a new, uncut tube section, which was previously slid onto the mandrel in the cutting station, is moved into the cutting station whereby the cycle of operation is ready to be repeated.

It will, of course, be understood that although only the mandrel 12 has been described in detail, that the other two mandrels 14 and 16 are similarly constructed so that all three mandrels function in the same manner as they are indexed through the three operating stations. Similarly, although only one sleeve 62 and only one mounting means therefor has been described in detail, the remaining sleeves 62 and their mounting means are of a similar construction. Also, where there is more than one intermediate trim band B to be cut from the tube section, additional parts similar to that shown in FIG. 6 may be utilized in the desired locations.

In order to support the end of each mandrel 10, 12, or 14 as it resides in the cutting station, a longitudinally slidable member 157 mounting the previously mentioned support pin 112 is provided. A cam (not shown) is operable to slide the member 157 longitudinally, relative to the frame 152 between operative and withdrawn positions. In the withdrawn position (FIG. 1), the member 157 and its pin 112 are free and clear of the longitudinal end of the mandrels thereby permitting the latter to be indexed into and out of the cutting station. After the mandrel is indexed into the cutting station, the cam (not shown) for actuating the member 157 slides the latter longitudinally into operative position (FIG. 2) whereby the support pin 112 slides into the opening 110 (see FIG. 8) on end cap 100 to form a support for the end of the mandrel as the backup roll 77 is moved between its inoperative and operative positions. After the tube section is cut, the member 157 is returned to its withdrawn position (FIG. 1). The member 157 may be biased by a spring (not shown) into its withdrawn (FIG. 1) position and the cam (not shown) for actuating the member 157 arranged to permit said spring to return the member 157 to said withdrawn position.

The member 157 may be provided with a cylindrical portion or cup 156 about the pin 112 and having an inner diameter substantially equal to the outer diameter of the mandrel. When the member 157 is slid from its withdrawn to its operative position, the cup 156 will pass over the end of the mandrel to engage and slide the end of the tube section into position on the mandrel. Of course, if the tube section T is already positioned in the desired longitudinal location at the loading station, the cup 156 will not affect the positioning of the tube section on the mandrel at the cutting station. The cam (not shown) which moves the member 157 into operative position may be operable to allow the member 157 and its cup 156 to slide slightly to the right (as shown in FIG. 9) out of the way of the backup roll 77 after the tube section T has been positioned by the cup 156.

The backup roll 77 may have a covering or outer layer of resilient material (e.g. urethane having a 90 to 95 durometer) 158 into which the cutting knives may penetrate slightly during the cutting operation. Use of a resilient material on the backup roll 77 will insure a long life to the cutting edges of the cutting knives. The faces of the cutting knives which define the cutting edge may be contoured (e.g. they may be slightly arcuate), thereby to determine the contour of the "turn-out" at the longitudinal ends of the cut container bodies.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form described being merely a preferred embodiment thereof.

We claim:

1. Apparatus for cutting tube sections from the inside out comprising:
   a mandrel shaft,
   means for rotating said mandrel shaft,
   a circular cutting knife fixed to said shaft,
   a sleeve carried on said mandrel shaft on one side of said cutting knife and adaptable to receive a tube section to be cut,
   said sleeve having an outside diameter at least as large as the diameter of said cutting knife,
   means mounting said sleeve on said mandrel shaft for movement between concentric and eccentric positions relative to said mandrel shaft,
   a support ring on the opposite side of said cutting knife, and
   means interconnecting said sleeve and support ring to provide simultaneous movement between said concentric and eccentric positions whereby the sleeve and support ring support the tube section as the latter is cut by said cutting knife.

2. Apparatus for cutting tube sections according to claim 1 wherein there is a first and second circular cutting knife fixed to said mandrel shaft and longitudinally spaced from one another a distance corresponding to the length of a container body to be cut from said tube section,
   said sleeve being carried on said mandrel shaft between said first and second cutting knives,
   a third cutting knife fixed to said mandrel shaft and longitudinally spaced substantially close to said second cutting knife than said first and second cutting knives and spaced from one another,
   said support ring being carried on said mandrel shaft between said second and third cutting knives to support a relatively narrow trim band as the latter is cut from the tube section by said second and third cutting knives.

3. Apparatus for cutting tube sections according to claim 1 wherein there is a first and second circular cutting knife fixed to said mandrel shaft and longitudinally spaced from one another a distance corresponding to the length of a container body to be cut from said tube section,
   said support ring being carried on said mandrel shaft adjacent said second knife to support a relatively narrow trim band as the latter is cut from the end of the tube section by said second cutting knife.

4. Apparatus for cutting tube sections according to claim 1 wherein said cutting knife has a central opening in which said mandrel shaft is received,
   said cutting knife also having a plurality of spaced openings,
   said interconnecting means comprising a plurality of interconnecting members passing through said spaced openings and connecting said sleeve and said support ring to one another.

5. Apparatus for cutting tube sections according to claim 4 wherein said spaced openings in said knife are each larger in area than the cross-sectional area of each of said interconnecting members whereby the latter are free for translatory movement within said spaced openings as the sleeve and support ring are shifted between said concentric and eccentric positions.

6. Apparatus for cutting tube sections according to claim 1 wherein said means for mounting said sleeve on said mandrel shaft comprises:
   a slide member associated with said cutting knife and longitudinally slidable on said mandrel shaft,
   said slide member having an external flange portion defining in part a frusto-conical surface,
   biasing means urging said slide member in a longitudinal direction,
   said sleeve having an internal flange defining in part a frusto-conical surface which is adapted to mate with the frusto-conical surface on the external flange of said slide member whereby such mating surfaces define cam means operable to convert said longitudinal biasing force on said slide member to a radial biasing force on said sleeve,
   said interconnecting means comprising a plurality of members extending through openings in said circular knife and connecting the internal flange of said sleeve with said support ring.

7. Apparatus for cutting tube sections according to claim 1 wherein there are a plurality of longitudinally spaced cutting knives on said mandrel shaft,
   some of said cutting knives being longitudinally spaced a distance corresponding to the desired length of a container body to be cut from said tube section,
   other of said cutting knives being longitudinally spaced substantially closer to one another and adapted to cut a relatively narrow trim band from the tube section between two container bodies,
   said sleeve having a longitudinal length substantially equivalent to the length of the desired container bodies to be cut,
   said support ring having a longitudinal length substantially equivalent to the longitudinal length of said trim band.

8. Apparatus for cutting tube sections according to claim 1 further comprising:
   backup means external of said sleeve movably mounted relative to said mandrel shaft between inoperable and operable positions,
   said backup means in being moved from said inoperable to said operable position engaging a tube section on said sleeve and shifting the latter along with said tube section and said support ring from a normally concentric position to an eccentric position causing the circular knife to project radially outwardly of said sleeve and support ring and thereby cut the tube section from the inside out as said mandrel shaft is rotated., 9. Apparatus for cutting tube sections according to claim 8 further comprising cam means for moving said backup means between said inoperable and operable positions in a predetermined motion.

10. Apparatus for cutting tube sections according to claim 8 wherein said backup means comprises:
    a roller having a longitudinal length at least as long as the longitudinal length of the tube section to be cut,
    said roller having an outer layer of resilient material.

11. Apparatus for cutting tube sections according to claim 1 wherein there are a plurality of cutting knives and a plurality of cylindrical spacers on said mandrel shaft positioning and securing said cutting knives in desired positions on said mandrel shaft,
  an end cap,
    means fastening said end cap to said mandrel shaft to secure said cutting knives and said spacers in a fixed position on said mandrel shaft,
  said support ring being located between the end cutting knife and said end cap.

12. Apparatus for cutting tube sections according to claim 1 further comprising means for supporting the free end of the mandrel shaft as the latter is rotated during the cutting operation.

References Cited
UNITED STATES PATENTS

| | | | |
|---|---|---|---|
| 2,298,366 | 10/1942 | Gladfelter et al. | 82—101 X |
| 2,701,015 | 2/1955 | Gottschalk | 82—102 |
| 3,359,841 | 12/1967 | Cvacho et al. | 82—82 |
| 3,400,620 | 9/1968 | Armbruster et al. | 82—82 |

HARRISON L. HINSON, Primary Examiner

U.S. Cl. X.R.

82—101